UNITED STATES PATENT OFFICE.

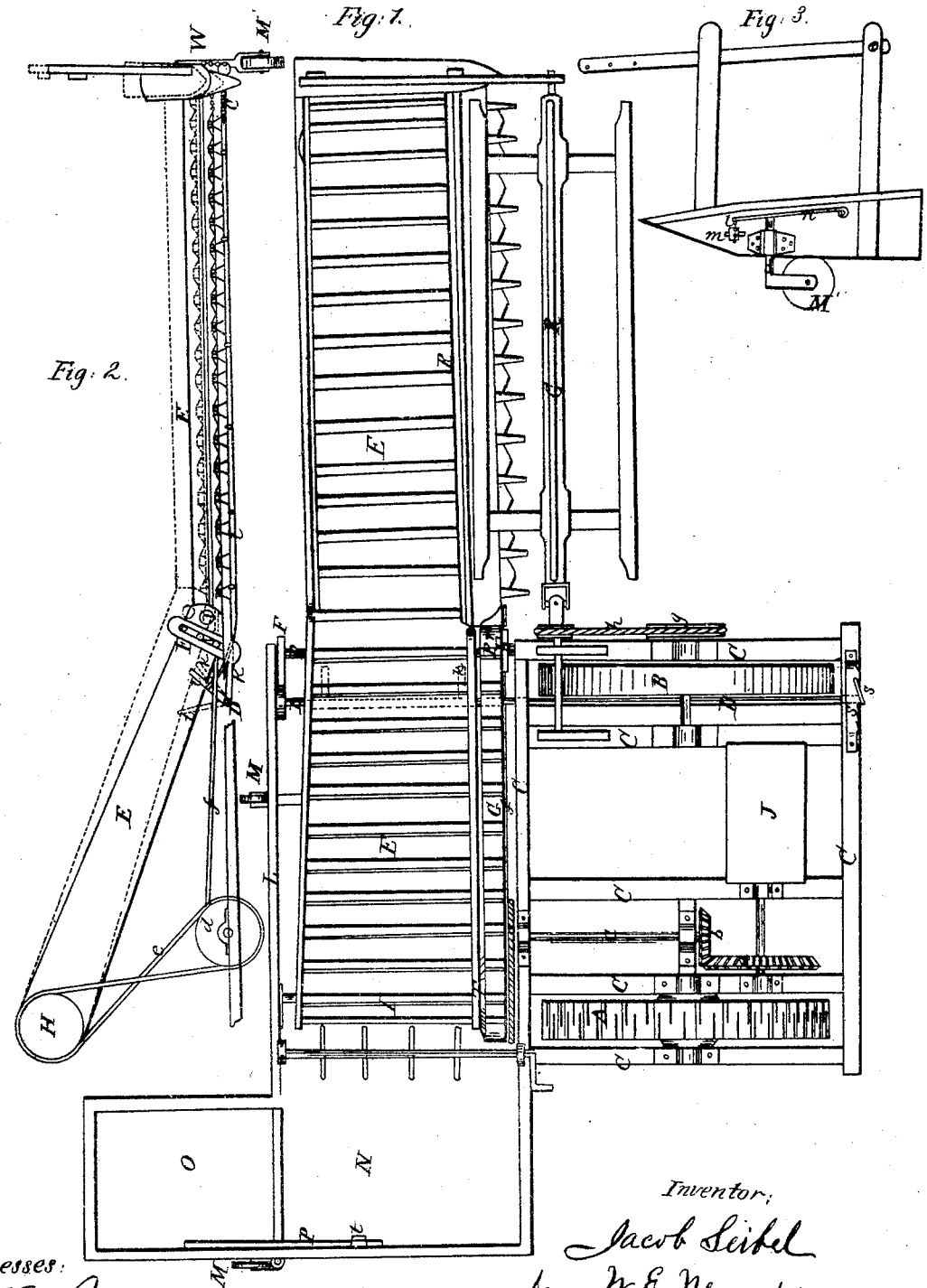

JACOB SEIBEL, OF MANLIUS, ILLINOIS.

IMPROVEMENT IN HARVESTERS.

Specification forming part of Letters Patent No. 45,642, dated December 27, 1864.

*To all whom it may concern:*

Be it known that I, JACOB SEIBEL, of Manlius, in the county of Bureau and State of Illinois, have invented a new and useful Improvement in Harvesters; and I do hereby declare the following to be a full, clear, and exact description thereof, reference being had to the accompanying drawings and the letters and figures marked thereon, which form part of this specification.

In said drawings, Figure 1 represents a plan or top view of my invention. Fig. 2 is a vertical section at the line $x$ in Fig. 1; and Fig. 3 represents an end view of the machine at W in Fig. 2.

Similar letters of reference in the different figures represent corresponding parts of my invention.

The nature of my invention consists in a novel arrangement for raising and adjusting the sickle at different heights from the ground, whereby the said adjustment is readily and easily accomplished.

To enable those skilled in the art to construct and make use of my invention, I will proceed to describe the same with particularity.

A and B represent the two large wheels, by which the power is imparted to the various parts of the machine, A, which propels the sickle, being provided with ribs upon the face of the wheel for the purpose of giving it greater propelling-power.

C C represent that part of the frame which is supported mainly upon the drive-wheels A B.

Upon the interior of the rim of the wheel A is a cogged gear, into which a pinion upon the shaft of the wheel $a$ fits, thus, by means of the bevel-gear upon the wheels $a$ $b$ and the shaft $c$, revolving the pitman-wheel $d$, and by means of the pitman $f$ driving the sickle. The same drive-wheel A, by means of the cord E, passing around the pitman-wheel $d$, and the drum-wheel H, in connection with the before-described intermediate gearing, operates the endless apron or elevator E. The shaft of the wheel B revolves with the wheel, and by means of the wheel $g$ and the cord or belt $h$ operates the reel R.

N O represent a box or compartment of the machine, in which the grain is deposited and bound by persons standing therein. After being bound into bundles the bundles are deposited upon the trap O, and when enough have accumulated to make a shock it is precipitated upon the ground by detaching the spring-catch $t$ from the lever or arm P.

The frame K, lying immediately back of the sickle, and the top of the endless apron E are raised above the plane of the sickle, so that as the grain is cut and drops upon said apron the ends will not come in contact with the sickle, whose action and rapid motion would derange the position of the grain upon the apron, thereby keeping the grain as even and facilitating the binding as much as possible.

L is a part of the frame projecting from the part O, and serves to support the apron E.

M represents truck-wheels, which support the machine in connection with the two wheels A B, before mentioned.

Immediately contiguous to the wheel H, around which the belt or cord $e$ passes, and fixed upon the same shaft or roller, I, which revolves the endless apron, is the drum-wheel T, which must be greater in diameter than said roller I, for the reasons hereinafter mentioned. At the point where the endless apron begins to incline upward there is fitted upon the supporting-bar P another drum-wheel, which revolves upon the bar $p$ aforesaid, said wheel being marked $r$.

Passing around the two drum-wheels T and $n$ is a narrow belt or band, G, which lies parallel to the inclined part of E, and is provided with similar buckets or projections for carrying up the grain. As both the endless apron E and the belt G are driven by the band $e$, and as the drum T is of greater diameter than the roller I, it follows that the belt G will travel up the incline somewhat faster than the apron E. The advantages of this arrangement are as follows: It is well known that in harvesters generally the grain, being heavier at the butt-end, and being also retarded in its passage along the apron by the action of the sickle upon the same, has a tendency to move up the incline of the apron obliquely, the heavier end toward the front of the harvester being lower down upon the apron than the opposite end. Thus the grain, in dropping from the upper end of the apron into the binder, instead of being deposited in a parallel and even manner, is thrown into a confused heap, which cannot be bound properly, nor, in fact, in any way, except with great difficulty and delay. Now, by means of my invention, this difficulty is obviated, for in the first place the endless apron is situated so far above the plane of the sickle that the ends of the straw are not retarded thereby; and, secondly, and especially since the ends of the grain must rest upon the belt G, its more rapid motion will compensate entirely for the tendency of the heavier end to drag behind, and thus the grain will drop evenly and properly from the apron, and can be bound readily, easily, and rapidly.

F F represent two slotted blocks, in which the ends of the bar $p$ supporting the endless apron E rest. The object of the slotted supports is to enable the apron to be raised up from the ground, as hereinafter described, the bar $p$ sliding up in said slots.

D represents a shaft passing through the machine, beneath the frame of the endless apron, supported in suitable bearings, so as to allow a rotating motion of said shaft D. To the front end of said shaft is rigidly attached an upright handle or lever, $s$, which is operated by the driver upon the seat J moving the lever as desired, and retaining it in any required position by means of the toothed bar $s'$. The said motion of the lever $s$ imparts a reciprocating rotating motion to the shaft. Directly beneath the endless apron this shaft is provided with the arms $k$ $k$, arranged substantially as shown, so that when the shaft is rotated toward the driver the said arms press against the endless apron and raise the same up from the ground, the bar $p$ sliding in the slots F F, as shown by the red lines in Fig. 2. Just in front of the frame of the endless apron the shaft D is also provided with the arm $i$, which contains several small holes. Into one of these holes is hooked a rod, $l$, that passes laterally beneath the sickle-bar, as shown. Near the outer end of the sickle-bar a small chain, $l'$, is fastened to said rod $l$, which chain passes about a pulley, $m$, and is attached to the end of the spring $n$, as seen in Fig. 3.

The truck-wheel M' is attached to the sliding rod $o$, as shown, so that when the spring $n$ is drawn down by the tension upon the rod $l$ and chain $l'$ the end of the machine is thereby raised from the ground and kept at the same height as the opposite end of the sickle-bar. The revolution of the shaft D by means of the arms $k$ and $i$ and the rod $l$ and chain $l'$ simultaneously elevates or lowers the sickle and the endless apron, keeping the same parallel with the ground.

Having described my improvement in harvesters, I will now proceed to point out specifically what I claim as new therein and desire to secure by Letters Patent—

1. The combination of the shaft D, provided with the arms $i$ $k$, the rod $l$, chain $l'$, and spring $n$, all arranged and operating substantially as and for the purposes specified and shown.

2. The arrangement, in combination with the above, of the frame carrying the endless apron E and auxiliary belt G, substantially as and for the purposes herein set forth and shown.

JACOB SEIBEL.

Witnesses:
  W. E. MARRS,
  L. L. COBURN.